US008861577B2

(12) United States Patent
Liu et al.

(10) Patent No.: US 8,861,577 B2
(45) Date of Patent: Oct. 14, 2014

(54) METHOD AND SYSTEM FOR FAULT IDENTIFICATION USING PRE-EQUALIZATION COEFFICIENTS

(71) Applicant: Rogers Communications Inc., Toronto (CA)

(72) Inventors: Jianming Liu, Markham (CA); Jun Ma, Markham (CA); Lixin Shi, Mississauga (CA); Jianguo Feng, Mississauga (CA)

(73) Assignee: Rogers Communications Inc., Toronto, Ontario (CA)

( * ) Notice: Subject to any disclaimer, the term of this patent is extended or adjusted under 35 U.S.C. 154(b) by 121 days.

(21) Appl. No.: 13/766,917

(22) Filed: Feb. 14, 2013

(65) Prior Publication Data

US 2014/0003478 A1    Jan. 2, 2014

Related U.S. Application Data

(60) Provisional application No. 61/665,124, filed on Jun. 27, 2012.

(51) Int. Cl.
*H04B 3/46* (2006.01)

(52) U.S. Cl.
CPC .......................................... *H04B 3/46* (2013.01)
USPC .......................................................... 375/224

(58) Field of Classification Search
CPC ........................................................ H04B 3/46
USPC .......................................................... 375/224
See application file for complete search history.

(56) References Cited

U.S. PATENT DOCUMENTS 6,438,163 B1     8/2002   Raghavan et al.
7,636,388 B2 *  12/2009   Wang et al. ................... 375/224

OTHER PUBLICATIONS

CIPO, CA Office Action relating to Application No. 2,806,884, dated Jul. 17, 2014.
Superseded, DOCSIS, Network Maintenance Using Pre-equalization, CM-GL-PNMP-VO1-100415, Apr. 15, 2010.

* cited by examiner

*Primary Examiner* — Jaison Joseph
(74) *Attorney, Agent, or Firm* — Rowand LLP

(57) ABSTRACT

A fault detection system and a processor implemented method of detecting a wire fault in a wired network are described. The wired network services a set of customer equipment devices. In one aspect, a method comprises: obtaining, from a plurality of the customer equipment devices, pre-equalization coefficients associated with equalizers of the plurality of the customer equipment devices; determining tap energies for taps associated with the equalizers based on the pre-equalization coefficients; selecting one of the taps; for each of a plurality of the customer equipment devices, assigning the customer equipment device to one of a plurality of groups by comparing the tap energy for the selected tap for that customer equipment device to thresholds associated with the groups; and determining that a wire fault is probable when one of the groups includes at least a threshold number of customer equipment devices.

20 Claims, 7 Drawing Sheets

METHOD AND SYSTEM FOR FAULT IDENTIFICATION USING PRE-EQUALIZATION COEFFICIENTS

TECHNICAL FIELD

The present disclosure relates to wired networks and, more particularly, to methods and systems for detecting wire faults in wired networks.

BACKGROUND

Wired networks, such as cable-based television networks, cable-based Internet service provider (ISP) systems, and wired telephone systems, may suffer from signal degradation due to faults in wires that deliver services in such systems. Such wire faults may include physical damage to the wires (also known as cable damage) and signal leakage (for example, due to improper shielding of wires). Cable damage may cause an impedance mismatch in the system and signal leakage may cause interference in the system.

Such wire faults may impact service quality. For example, in a television network, such as a cable-based television network, an impedance mismatch (which may be caused, for example, due to cable damage) may create a micro-reflection which may result in ghosting of the video. That is, a second image, which is offset in time and amplitude, may appear to the right of the incident signal.

Wire faults may also cause service quality problems to arise in other types of wired networks. For example, for Internet service provider (ISP) systems, wire faults may cause packets to be dropped and throughput to be slowed down. In telephone networks, wire faults may cause micro-reflections which result in dropped packets and the occurrence of voice interrupts and echoes.

Wire fault detection has previously been a laborious process. For example, where cable damage is suspected, a long stretch of cable may be manually inspected in order to identify the location of the fault. This can be particularly time consuming in networks where cables are buried.

BRIEF DESCRIPTION OF THE DRAWINGS

Like reference numerals are used in the drawings to denote like elements and features.

DETAILED DESCRIPTION OF EXAMPLE EMBODIMENTS

In one aspect, the present disclosure describes a processor implemented method of detecting a wire fault in a wired network. The wired network services a set of customer equipment devices. The method includes: obtaining, from a plurality of the customer equipment devices, pre-equalization coefficients associated with equalizers of the plurality of the customer equipment devices; determining tap energies for taps associated with the equalizers based on the pre-equalization coefficients; selecting one of the taps; for each of a plurality of the customer equipment devices, assigning the customer equipment device to one of a plurality of groups by comparing the tap energy for the selected tap for that customer equipment device to thresholds associated with the groups; and determining that a wire fault is probable when one of the groups includes at least a threshold number of customer equipment devices.

In another aspect, a fault detection system for detecting a wire fault in a wired network is described. The wired network services a set of customer equipment devices. The fault detection system includes a memory and a processor coupled to the memory. The processor is configured to: obtain, from a plurality of the customer equipment devices, pre-equalization coefficients associated with equalizers of the plurality of the customer equipment devices; determine tap energies for taps associated with the equalizers based on the pre-equalization coefficients; select one of the taps; for each of a plurality of the customer equipment devices, assign the customer equipment device to one of a plurality of groups by comparing the tap energy for the selected tap for that customer equipment device to thresholds associated with the groups; and determine that a wire fault is probable when one of the groups includes at least a threshold number of customer equipment devices.

In yet another aspect, a non-transitory computer readable storage medium comprising computer executable instructions for detecting a wire fault in a wired network is described. The wired network services a set of customer equipment devices. The computer executable instructions include instructions for: obtaining, from a plurality of the customer equipment devices, pre-equalization coefficients associated with equalizers of the plurality of the customer equipment devices; determining tap energies for taps associated with the equalizers based on the pre-equalization coefficients; selecting one of the taps; for each of a plurality of the customer equipment devices, assigning the customer equipment device to one of a plurality of groups by comparing the tap energy for the selected tap for that customer equipment device to thresholds associated with the groups; and determining that a wire fault is probable when one of the groups includes at least a threshold number of customer equipment devices.

Example Content Delivery System

Figure 1:
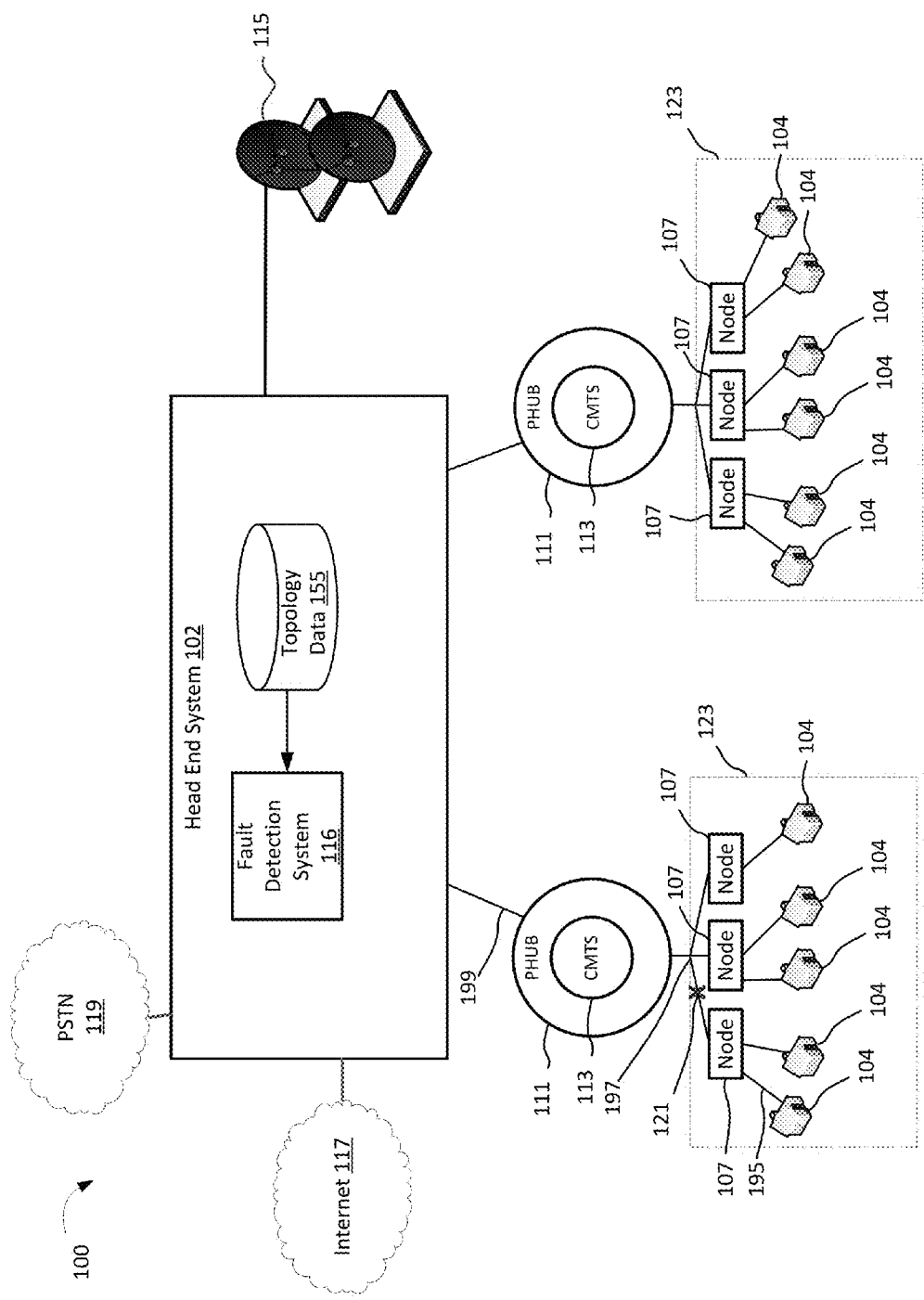
FIG. 1 is a block diagram of an example wired network in accordance with example embodiments of the present disclosure.

Referring now to FIG. 1, a block diagram of an example wired network 100 is illustrated in which example embodiments of the present disclosure may be applied. The wired network 100 may be a service provider network which provides one or more services to subscribers in the wired network 100. For example, in some embodiments, the wired network 100 may be a content delivery system which is configured to deliver content from a content source system to a content destination. The content delivery system may, for example, be a broadcast television system which delivers television content such as broadcast television shows.

The wired network 100 may, in some embodiments, act as in Internet service provider (ISP) to allow a plurality of subscribers connected to the wired network 100 to access the Internet. For example, a modem associated with a subscriber may be used to send and receive data packets to online servers or systems. In some embodiments, the ISP system may be a cable Internet system which is configured to provide broadband Internet access over a cable television infrastructure. For example, in at least some embodiments, the wired network 100 may be configured to deliver services accordingly to the Data Over Cable Service Interface Specification (DOCSIS). DOCSIS is an international telecommunications standard that permits high-speed data transfer to occur over cable TV (CATV) infrastructure. Accordingly, in at least some embodiments, components of the wired network 100 described below may be configured to operate according to the DOCSIS specification. It will be appreciated that other specifications may be used in other embodiments. For example, in some embodiments, the ISP system may be a digital subscriber line (DSL) system which is configured to provide Internet access over the wires of a local telephone network.

In some embodiments, the wired network 100 may be configured for providing telephone services. That is, the wired network 100 may provide telephone services to a plurality of subscribers connected to the wired network. The telephone services may, in some embodiments, be voice over internet protocol (VOIP) services. In other embodiments, the wired network 100 may be a traditional telephone network which may, for example, utilize copper wires.

It will be appreciated that the wired network 100 may, in at least some embodiments, provide a plurality of subscription based services. For example, the wired network 100 may provide any combination of Internet, telephone, television, or other services.

The wired network 100 includes back-end systems which provide services to subscribers. In the example illustrated, the back-end system is referred to as a head end system 102. The specific configuration of the back-end systems will depend on the nature of the services provided by the wired network 100 and on the specific wired network 100 technology.

For example, as noted above, the wired network 100 may be configured for providing content delivery services to subscribers. In some embodiments, the wired network 100 may be configured to deliver television programming. In at least some such embodiments, the head end system 102 is configured to deliver content to a customer equipment (CE) device 104, such as a receiver. A receiver may be connected to a media player, such as a television, on which content received at the receiver may be displayed. In at least some example embodiments, the receiver, or parts thereof, may be internal to a media player (e.g. the television). For example, a receiver may be a component of a television which is included in the television at the time of manufacture. In other embodiments, a receiver may be an external receiver which is connected to the media player (e.g. the television) through a wired or wireless transport medium.

One or more of the receivers which are serviced by the head end system 102 may, in at least some example embodiments, be a set top box. A set top box is a device which connects to a television (or other display) and an external source of signal, turning the signal into content which may be displayed on the television (or other display). The term set top box includes devices which do not, necessarily, sit on top of a television. That is, the term set top box may refer to any device which is external to a television (or other display) and which receives an external signal, turns the signal into content and displays the signal on the display. The receivers may also take other forms including, for example, a gaming console, a cable card, a personal computer, a tablet device, a smartphone, etc. The receivers may be any electronic devices at which content from a head end system 102 may be received.

Where the wired network 100 is configured to deliver content to subscribers, the head end system 102 may include or connect to a content acquisition system 115. The content acquisition system 115 of FIG. 1 is illustrated as a plurality of satellite dishes. Such satellite dishes may be configured to receive content from one or more satellites. In various embodiments, the content acquisition system 115 may be configured to receive content through other means instead of, or in addition to, the satellite dishes. For example, the content acquisition system 115 may include one or more antennas which receive radio frequency signals, such as signals transmitted through a terrestrial based network. In at least some embodiments, the content acquisition system 115 may be configured to receive content through a network, such as the Internet. In at least some embodiments, the content acquisition system 115 may be configured to receive content though a wired transport medium such as, for example, a cable. The cable may, in some example embodiments, include a coaxial cable and/or a fibre optic cable. The content received through the content acquisition system 115 may include, for example, broadcast content which may be received in streaming fashion from one or more television networks. Such content may be referred to as source broadcast streams.

In order to prevent unauthorized access to content (such as source broadcast streams), such content may be scrambled or otherwise encrypted. The head end system 102 may receive scrambled and/or encrypted content (such as encrypted source broadcast streams). Such encrypted and/or scrambled content may, for example, be received at the content acquisition system 115. The head end system 102 may be configured to decrypt or decode such content.

As also noted above, in some embodiments, the wired network 100 may be configured to provide Internet services to subscribers. In some such embodiments, the head end system 102 may be configured to provide such Internet services. More particularly, the head end system 102 may connect to the Internet 117 and may include or be connected to subsystems which may be useful for providing Internet services to subscribers. Such subsystems may, for example, include a domain name server (DNS), routers, and other subsystems.

In embodiments in which the head end system 102 is configured to provide Internet services, the head end system 102 may provide the Internet services to customer equipment (CE) device 104 which may be referred to as modems. For example, a subscriber may be associated with a cable or DSL modem which sends data to and receives data from the Internet via the back end systems of the wired network 100 (such as the head end system 102).

In some embodiments, the wired network 100 may be configured to provide telephone services to subscribers. Accordingly, the head end system 102 may be configured to support such telephone services. For example, the head end system 102 may be connected to the public switched telephone network (PSTN) 119. In embodiments in which the head end system 102 provides VoIP telephone services, the head end system 102 may be configured to map a phone number associated with a subscriber to an IP address associated with customer equipment device 104 for that subscriber. For example, the phone number may be mapped to an IP address for an IP phone associated with the subscriber.

The head end system 102 may be owned and/or operated by a service provider such as a content service provider (e.g. a television service provider), a telephone service provider and/or an Internet service provider.

In the example embodiment illustrated, the back end system which provides the services is referred to as a head end system 102 and the system for which the services are provided is referred to as customer equipment (CE) device 104. However, these systems may be referred to using other terminology. For example, the head end system 102 may be referred to as a service provider system or a back end system. The customer equipment device 104 may be referred to as a modem and/or a receiver in at least some embodiments. Since the customer equipment devices 104 are typically located in locations associated with a subscriber such as, for example, the home of a subscriber, the customer equipment devices 104 may be referred to as Customer Premises Equipment (CPE).

The customer equipment devices 104 may be owned by the subscriber or the customer equipment devices 104 may be owned by another party such as, for example, the service provider. Thus, use of the term customer equipment does not require ownership of the equipment by the customer. Rather, the customer equipment device is hardware that is associated with a subscriber's location and which is typically located in the subscriber's premises.

Customer equipment devices 104 are illustrated in FIG. 1 using houses to illustrate that the customer equipment devices 104 may be distributed among different households associated with different subscribers. However, it will be appreciated that a single household may, in some embodiments, include multiple customer equipment devices 104 and that customer equipment devices 104 need not, in all embodiments, be located within houses.

The customer equipment devices 104 are connected to the head end system 102 through wired transport mediums 195, 197, 199 (such as coaxial cable and/or fibre optic cable). The wired transport mediums 195, 197, 199 may include cables. The wired transport mediums 195, 197, 199 may, in various embodiments, include copper, or other wires, such as coaxial cable and/or may include an optical transport medium, such as fibre optic cables.

As illustrated in FIG. 1, the head end system 102 may not be connected directly to the customer equipment devices 104. In at least some embodiments, one or more intermediary systems or devices may connect the head end system 102 to the customer equipment devices 104. For example, in at least some embodiments, a hub 111 (which may also be referred to as a distribution hub) may connect to the head end system 102. The hub 111 may be connected to the head end system 102 through a transport medium 199. In at least some embodiments, the transport medium 199 connecting the head end system 102 to the hub 111 may be a high bandwidth transport medium, such as a fibre cable.

In the example embodiment illustrated, the wired network 100 includes two hubs 111. However, in other embodiments, the wired network 100 may include a different number of hubs. The exact number of hubs in the wired network 100 will depend, in part, on the quantity of customer equipment devices 104 serviced by the wired network 100. In the example embodiment illustrated, the hubs 111 are primary hubs (PHUB).

Each hub 111 may service a set of nodes 107. For example, each hub 111 may function to deliver content to a specific node 107, or set of nodes 107. In the example embodiment illustrated, each hub 111 is connected to and services three nodes 107. However, in practice, the number of nodes serviced by each hub 111 may be much greater. Transport mediums 197 may connect the hubs 111 to the nodes 107. In at least some embodiments, the transport mediums 197 connecting the hubs 111 to the nodes 107 are high bandwidth transport mediums, such as a fibre cables.

Each node 107 may be connected to a set of customer equipment devices 104. That is, each node 107 may connect the head end system 102 (via the hub 111) to one or more of the customer equipment devices 104 connected to that node 107. In the example embodiment illustrated, there are two customer equipment devices 104 connected to each node 107. However, in practice, the number of customer equipment devices 104 connected to the nodes 107 may be much greater. Each node 107 may service customer equipment devices 104 in a specific geographic area.

Transport mediums 195 may connect the nodes 107 to the customer equipment devices 104. The transport mediums connecting the nodes 107 to the customer equipment devices 104 may include low bandwidth transport mediums, such as copper cable (e.g. coaxial cable).

Various components of the wired network 100 and the customer equipment devices 104 may define a topology for the wired network 100. The topology for the wired network 100 defines the form of interconnections of the components of the wired network 100 and the customer equipment devices 104. That is, the term topology is used to describe the manner by which a customer equipment device 104 connects to the head end system 102 and/or other parts of the wired network 100. Each customer equipment device 104 may connect to the head end system 102 via a specific hub 111, a specific termination system 113 (the termination system 113 will be described below) and a specific node 107. Accordingly, each customer equipment device 104 may connect to the head end system 102 using specific transport mediums 195, 197, 199. These specific connections define the topology of the wired network 100.

In at least some embodiments, the wired network 100 may track this topology. For example, the wired network 100 may, in at least some embodiments, obtain topology data 155 specifying specific components (e.g. the specific nodes 107 and/or hubs 111 and/or termination systems 113 and/or transport mediums 195, 197, 199) which connect a customer equipment device 104 to the head end system 102. For example, the topology data 155 may specify the path from the head end system 102 to each customer equipment device 104 serviced by the wired network 100.

The topology data 155 may be stored in memory of the wired network 100. In some example embodiments, the memory includes non-volatile memory, such as flash memory. In at least some example embodiments, the memory includes a solid state drive (SSD) and/or a magnetic storage, such as a hard disk drive (HDD). Other types of memory may be used instead of or in addition to those listed above. In the example embodiment illustrated, the topology data 155 is stored in memory of the head end system 102. However, in other embodiments, the topology data 155 may be stored elsewhere.

The topology data 155 may, in at least some embodiments, be automatically generated. For example, the topology data 155 may be generated by sending data from the head end system 102 to a customer equipment device 104 and by tracking the components which are used in the transmission of the data. Other methods of generating the topology data 155 may be used in other embodiments. The topology data 155 may be repeatedly updated to account for customer equipment devices 104 brought online or offline in the wired network 100.

The wired network 100 may include one or more termination systems 113. The termination systems 113 may be located in the head end system 102 and/or in a hub 111 (such as a primary hub (PHUB) and/or a secondary hub (SHUB)). In the embodiment illustrated, the termination systems 113 are located in the hubs 111.

In at least some embodiments, the termination systems 113 are cable modem termination systems (CMTS). A CMTS is a component which is used to provide high speed data services to cable subscribers. In the example embodiment illustrated, the CMTS is used to provide high speed content delivery services. For example, the CMTS may be used to deliver content, such as television programming, or to provide Internet access to the customer equipment devices 104, such as modems and receivers. The CMTS may be configured to service a specific set of nodes (e.g. to send and receive data to these nodes), thereby servicing the customer equipment devices 104 connected to those nodes.

The CMTS may be used to provide multiple services to subscribers. That is, the CMTS may be used by a multiple system operator to provide a plurality of services, such as data (e.g. Internet), voice (e.g. phone), and/or video (e.g. television) services to subscribers.

A set of customer equipment devices 104 serviced by the wired network 100 may be located in a specific geographic area which may be referred to as a service area 123. One or more components of the wired network 100 may associate a customer equipment device 104 with a specific service area 123. For example, the head end system 102 may maintain, in memory, a log associating a customer equipment device with a service area 123. This log may be periodically updated to account for customer equipment devices 104 added or taken away from a service area 123. Each service area 123 may, in some embodiments, be serviced by one or more components that does not service another service area 123. For example, in the embodiment illustrated, each service area 123 is associated with a separate termination system 113. In at least some embodiments, the service area 123 may be logged within the topology data 155.

The head end system 102 and the customer equipment devices 104 are configured to permit downstream communications to the customer equipment devices 104 through respective transport mediums and protocols. Similarly, the head end system 102 and the customer equipment devices 104 are configured to provide for upstream communications from one or more of the customer equipment devices 104 to the head end system 102 (and/or other components of the wired network 100). The upstream communications (i.e. communications originating from a customer equipment device 104 which are sent to the head end system 102) may operate on the same transport mediums 195, 197, 199 and/or transport protocol as the downstream communications (downstream communications are communications originating from the head end system 102 which are sent to one or more customer equipment devices 104). For example, in a wired television system, such as a cable television system, communications originating from a customer equipment device 104 may be sent to the head end system 102 through the wired transport mediums 195, 197, 199.

The upstream communications permit the customer equipment devices 104 to communicate with the head end system 102. As will be described in greater detail below, the upstream communications may permit a customer equipment device 104 to share pre-equalization coefficients associated with an equalizer on the customer equipment device 104 with other devices, servers or systems connected to or included in the wired network 100. Such pre-equalization coefficients may be used to detect wire faults 121 such as physical damage to wired transport mediums 195, 197, 199 in the wired network 100 and, in at least some embodiments, to estimate the location of the wire fault.

To detect such wire faults 121, in at least some embodiments, the wired network 100 may include or be connected to a fault detection system 116. In the embodiment illustrated, the fault detection system 116 is a subsystem operating in the head end system 102. However, it will be appreciated that the fault detection system 116 may be located in other components within the wired network 100 or may be a separate stand-alone system operating within or connected to the wired network 100. For example, in some embodiments, fault detection systems 116 are included in the termination systems 113.

The fault detection system 116 will be discussed in greater detail below with reference to FIGS. 2 to 7.

An example wire fault 121 has been shown in a wired transport medium 197 in FIG. 1. The wired transport medium 197 containing the wire fault 121 services two customer equipment devices 104. As will be discussed in greater detail below, the fault detection system 116 may be used to detect the existence of a wire fault 121 and, in at least some embodiments, to detect the location of the wire fault 121. More particularly, since the wire fault 121 affects a plurality of customer equipment devices 104, the wire fault may be detected by observing how the customer equipment devices 104 are compensating for micro-reflections.

The wire fault 121 may, in at least some embodiments, cause a micro-reflection to occur in the wired network 100. A micro-reflection is a copy of a communication signal. A micro-reflection may occur when an upstream signal (i.e. a signal sent from a customer equipment device 104) encounters an impedance mismatch somewhere in its upstream path. For example, an impedance mismatch caused by a wire fault may be encountered. This impedance mismatch may cause redirection of a fraction of the signal's energy back towards the customer equipment device 104.

To detect such micro-reflections (and thus, to detect wire faults), operators of wired networks 100 typically summarize calls from customers at specific areas and then field technicians use instruments to verify possible damage spots in the signal path. Such techniques are inefficient and time consuming. Other techniques have been proposed for automatically identifying wire faults. However, prior methods require a huge amount of time to analyze data. More particularly, prior methods have used required a frequency domain division of one customer equipment devices frequency domain with another customer equipment devices frequency domain. If the two responses are exactly the same, a resulting quotient frequency response will be unity at all frequencies with a flat phase response at zero degrees. The customer equipment devices frequency domain is calculated with FFT128 with a set of coefficients. A 128 point fast fourier transform (FFT) is used to find an impulse response associated with the frequency domain. The technique involves comparing all customer equipment devices 104 using a 128 point FFT. Thus, prior solutions have required very complex calculation logic and a long computation time.

Figure 3:
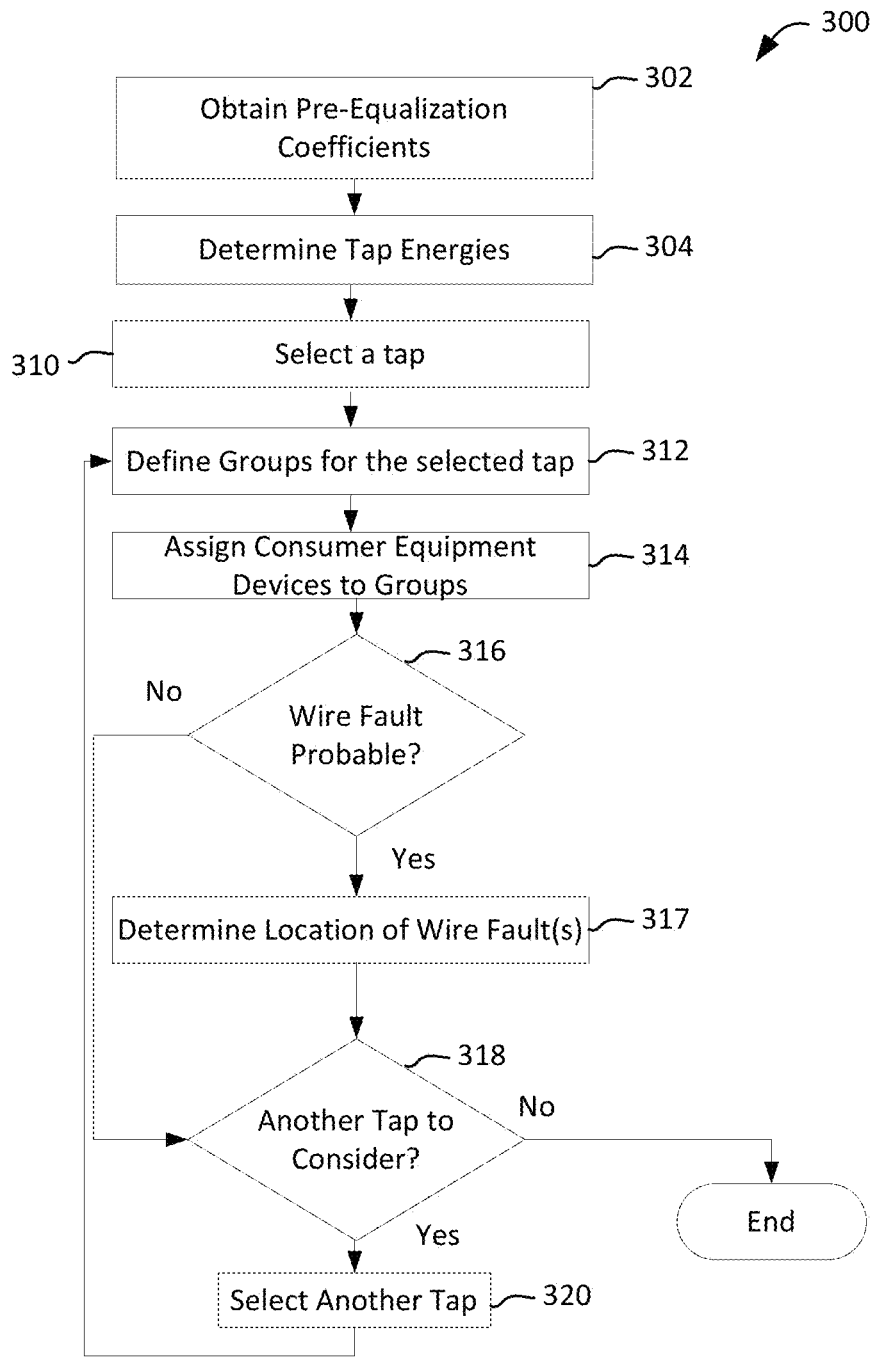
FIG. 3 is a flowchart of a method for detecting a wire fault in accordance with example embodiments of the present disclosure.
Figure 5:
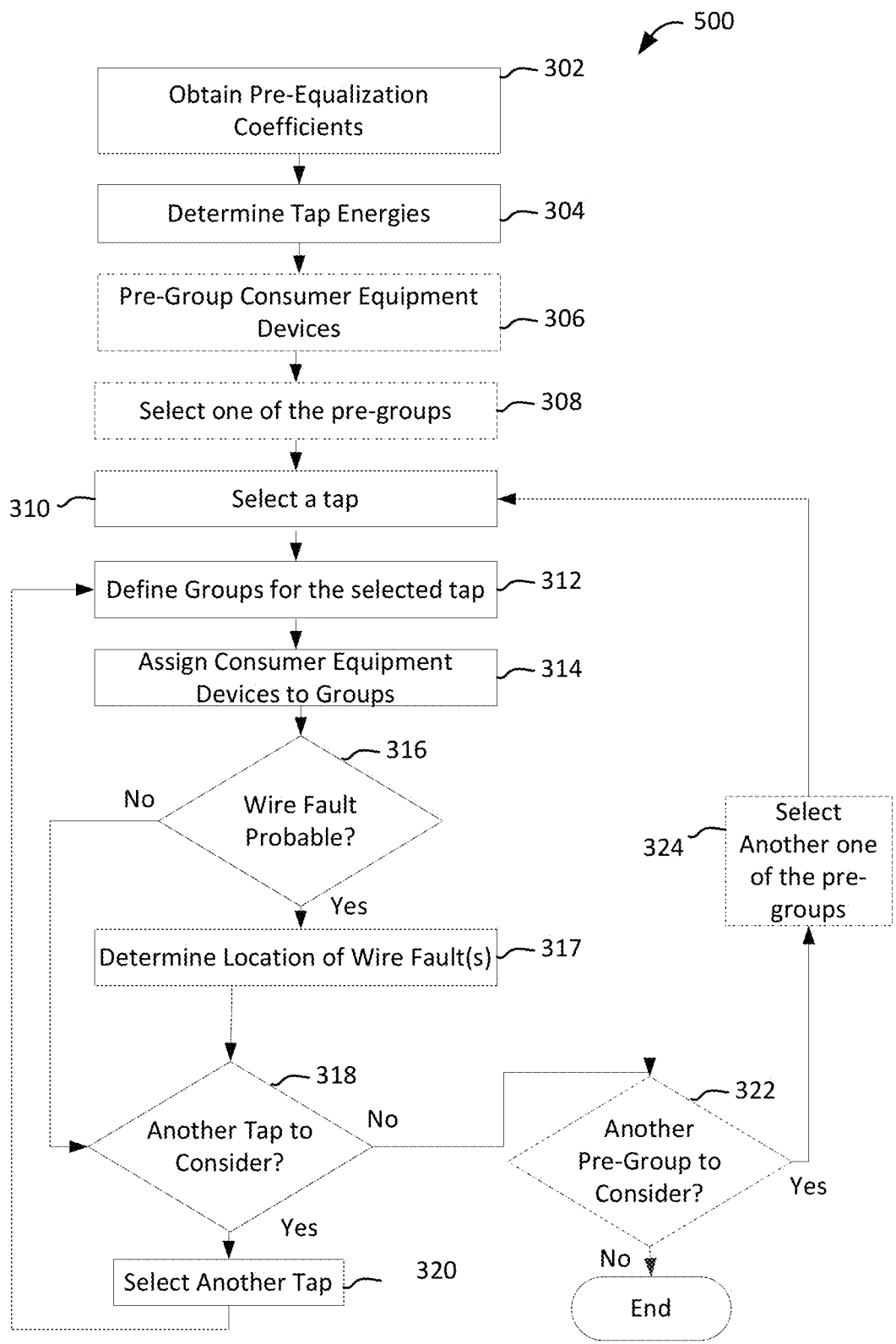
FIG. 5 is a flowchart of a method for detecting a wire fault in accordance with example embodiments of the present disclosure.
Figure 6:
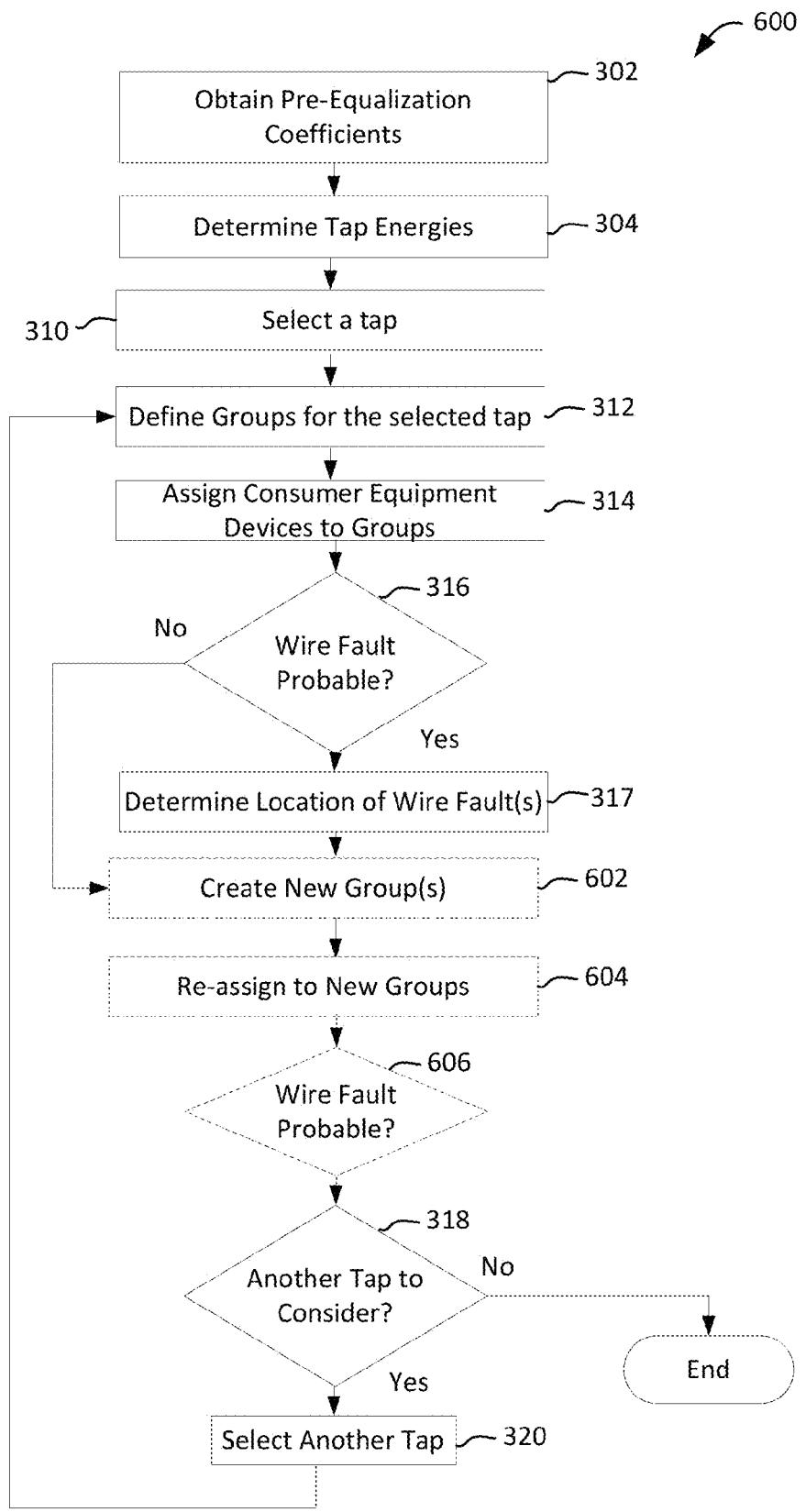
FIG. 6 is a flowchart of a method for detecting a wire fault in accordance with example embodiments of the present disclosure.

As will be understood following the discussion of the methods 300, 500, 600 of FIGS. 3, 5 and 6, the fault detection system 116 described herein uses a different approach for automatically detecting wire faults which is computationally efficient. This allows wire faults to be identified rapidly.

The wired network 100 and/or any of the components, features or systems of the wired network 100 discussed herein, in at least some embodiments, include one or more processors and one or more memory elements storing computer executable instructions. In at least some embodiments, the wired network 100 and/or any of the components, features or systems of the wired network 100 may operate under stored program control and execute the computer executable instructions stored on the memory element(s).

In at least some embodiments, the fault detection system 116 includes a processor which executes processor executable instructions stored in memory associated with the fault detection system 116.

Furthermore, any of the features of any of the systems included in the head end system 102 may be provided by other systems and any one or more of these features may be provided by other systems or subsystems of the head end system 102 not specifically discussed herein. More particularly, the head end system 102 may not be physically or logically divided in the manner illustrated in FIG. 1. In at least some embodiments, components of the head end system 102 may be physically or logically separated from one another. In at least some embodiments, the head end system 102 may be physically separated and may, for example, include a super head end system and one or more regional or local head end systems. The super head end system and/or the regional or local head end systems may separately or collectively perform some of the functions described above with reference to FIG. 1.

In at least some example embodiments, the head end system 102 may be a modular solution in which various functions or features described herein are provided by various modules. Such modules may, for example, be rack mounted electrical devices and may interconnect with one another to collectively provide functions and features described herein. In at least some embodiments, one or more of the modules, features, systems or subsystems described herein may contain one or more processors and a memory having computer readable instructions stored thereon. The computer readable instructions may be executable by the processors and may cause the processors to provide functions described herein.

Example Customer Equipment Device

Figure 2:
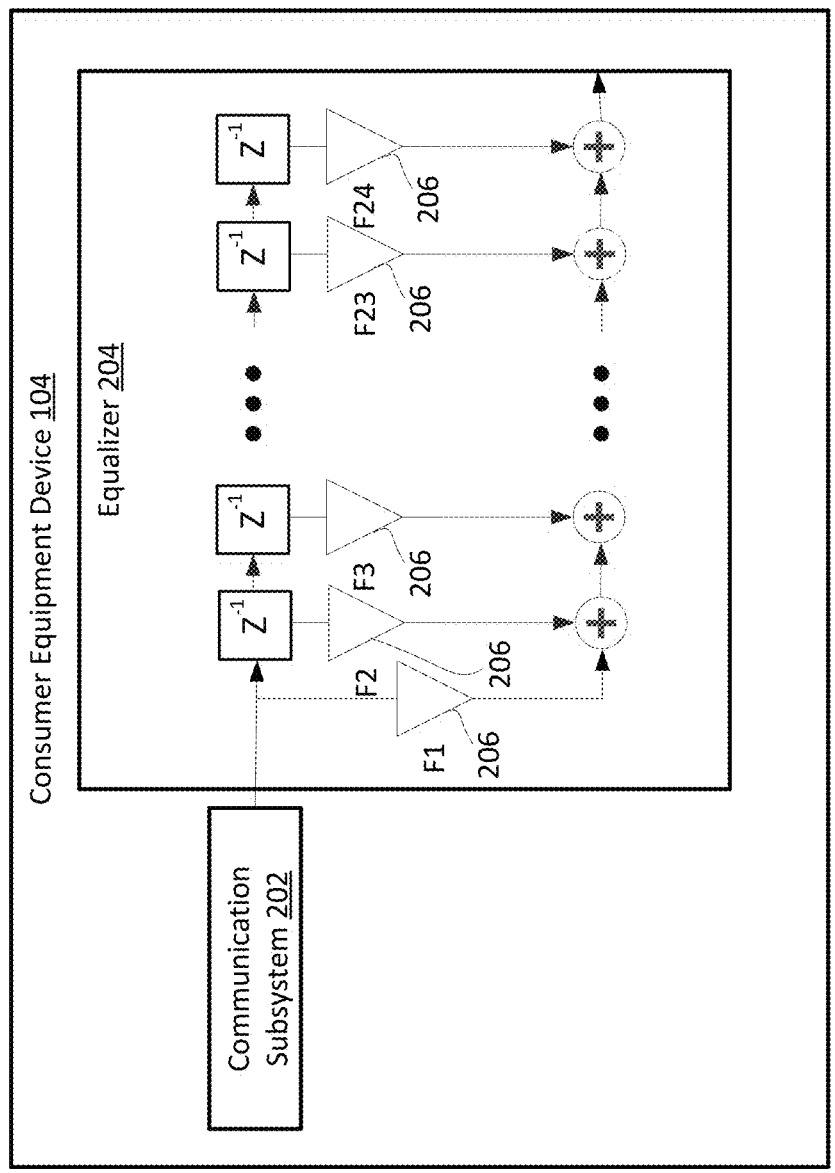
FIG. 2 is a block diagram of an example customer equipment device in accordance with example embodiments of the present disclosure.

Referring now to FIG. 2, an example customer equipment device 104 is illustrated. The customer equipment device 104 may, for example, be a modem and/or a receiver. Other types of customer equipment devices 104 are discussed above with reference to FIG. 1.

The customer equipment device 104 includes a communication subsystem 202. The communication subsystem 202 may be configured for receiving data from other components of the wired network 100 (FIG. 1) such as, for example, receiving data from the head end system 102, the termination system 113 and/or the fault detection system 116. The communication subsystem 202 may also be configured for sending data to other components of the wired network 100 (FIG. 1) such as, for example, sending data to the head end system 102, the termination system 113 and/or the fault detection system 116.

The customer equipment device 104 also includes an equalizer 204. The equalizer 204 is an adaptive equalizer which is configured to automatically compensate for micro-reflections in the wired network 100 (FIG. 1). For example, the equalizer may compensate for micro-reflections received at the customer equipment device 104 (e.g. contained in signals received at the communication subsystem 202).

More particularly, the equalizer 204 includes a plurality of taps 206. Each tap may be considered the combination of a delay element and a multiplier that associated with respective pre-equalization coefficients F1, F2, F3, F23, F24 that set the gain for each tap The equalizer 204 is configured to automatically identify the pre-equalization coefficients that are required to compensate for the presence of micro-reflections. For example, the equalizer 204 may undergo a configuration routine to identify the pre-equalization coefficients. For example, the equalizer may transmit a signal upstream and may then observe the signals that are reflected back and received at the customer equipment device 104. Then, the pre-equalization coefficients F1, F2, F3, F23, F24 required to compensate for those reflected signals may be determined.

In the example illustrated, there are twenty-four taps 206 (though only a subset of these taps are depicted). This equalizer 204 may be referred to as a 24 tap equalizer. It will be appreciated that the equalizer 204 may have a greater or lesser number of taps in other embodiments.

The customer equipment device 104 is configured to be able to adjust the pre-equalization coefficients associated with the equalizer 204 and to provide the pre-equalization coefficients associated with the equalizer 204 to one or more other components included in or connectable to the wired network 100 (FIG. 1). For example, in at least some embodiments, the customer equipment device 104 is configured to be able to adjust the pre-equalization coefficients F1, F2, F3, F23, F24 and to provide the pre-equalization coefficients F1, F2, F3, F23, F24 to the fault detection system 116.

The customer equipment device 104 includes other components and systems apart from those depicted in FIG. 2. For example, the customer equipment device 104 includes or is connectable to a power source.

Wire Fault Detection

Methods 300, 500, 600 of detecting a wire fault will now be discussed with reference to FIGS. 3 to 7.

One or more application or module stored in memory of the wired network 100 (such as in the head end system 102 and/or the termination system 113) may be configured to perform one or more of the methods 300, 500, 600 of FIGS. 3, 5 and 6. In at least some example embodiments, a fault detection system 116 (FIG. 1) may be configured to perform one or more of the methods 300, 500, 600 of FIGS. 3, 5 and 6. More particularly, one or more application or module in the head end system 102, termination system 113 and/or the fault detection system 116 may contain computer readable instructions which cause a processor of the head end system 102, termination system 113 and/or a processor of the fault detection system 116 to perform one or more of the methods 300, 500, 600 of FIGS. 3, 5 and 6. Accordingly, in some embodiments, one or more of the methods of 300, 500, 600 may be performed by a processor which is internal to the termination system 113 and, in some embodiments, one or more of the methods 300, 500, 600 of FIGS. 3, 5 and 6 may be performed by a processor which is internal to the head end system 102 or another system. For example, the fault detection system 116 may include a processor and processor readable instructions which, when executed by the processor, cause the processor to perform one or more of the methods 300, 500, 600 of FIGS. 3, 5 and 6.

Referring first to FIG. 3, an example embodiment of a method 300 for detecting a wire fault in accordance with example embodiments of the present disclosure is illustrated in flowchart form.

At 302, the fault detection system 116 obtains, from a plurality of customer equipment devices 104 (FIG. 2), pre-equalization coefficients F1, F2, F3 . . . F23, F24 (FIG. 2) associated with equalizers of the plurality of customer equipment devices 104 (FIG. 2). For example, the fault detection system 116 may, in some embodiments, obtain pre-equalization coefficients from all customer equipment devices 104 in the wired network 100 (or, in the case where some customer equipment devices are unable to send pre-equalization coefficients, from the customer equipment devices 104 that are capable of sending such pre-equalization coefficients to the fault detection system 116).

In some embodiments, pre-equalization coefficients may only be received at the fault detection system 116 from a subset of the customer equipment devices 104 in the wired network 100. For example, the fault detection system 116 may obtain pre-equalization coefficients only from customer equipment devices 104 sharing some characteristic. For example, multiple fault detection systems 116 may be deployed in the wired network 100, each servicing a separate geographic area. In some cases, a fault detection system 116 may be associated with a specific termination system 113 and that fault detection system 116 may only obtain the pre-equalization coefficients associated with the customer equipment devices 104 serviced by that termination system 113.

In some embodiments, at 302, all pre-equalization coefficients associated with an equalizer 204 (FIG. 2) are obtained from each customer equipment device 104. That is, a customer equipment device 104 may provide all of its pre-equalization coefficients to the fault detection system 116. In other embodiments, at 302, each customer equipment device 104 may only provide a subset of the available pre-equalization coefficients.

When the pre-equalization coefficients are obtained at the fault detection system 116, they may, in at least some embodiments, be stored in memory associated with the fault detection system 116. The pre-equalization coefficients may be stored in a manner which maintains the association between the pre-equalization coefficients and the customer equipment device 104 from which those pre-equalization coefficients were obtained. For example, the pre-equalization coefficients obtained from a particular customer equipment device 104 may be stored with an identifier (such as a Media Access Control (MAC) address) uniquely identifying that customer equipment device 104.

At 304, the fault detection system 116 may determine tap energies for taps associated with the equalizers based on the pre-equalization coefficients. More particularly, for each customer equipment device 104 from which pre-equalization coefficients were obtained at 302, the fault detection system 116 may determine tap energies for the taps of the equalizers included in those customer equipment devices 104. In at least some embodiments, at 304, pre-equalization impulse values in a time domain are determined based on a fast fourier transform (FFT) applied to the pre-equalization coefficients. More particularly, a fast fourier transform may be used to find an impulse response associated with the frequency domain pre-equalization coefficients. For example, a 128 point FFT (128 FFT) may be used to identify the tap energies for taps of an equalizer of a customer equipment device 104. This procedure may be performed independently for each customer equipment device 104 so that tap energies for a plurality of taps are determined for each customer equipment device 104. The tap energies may be stored in memory associated with the fault detection system 116 and may be associated with a unique identifier for the customer equipment device 104 which they relate to.

Figure 4:
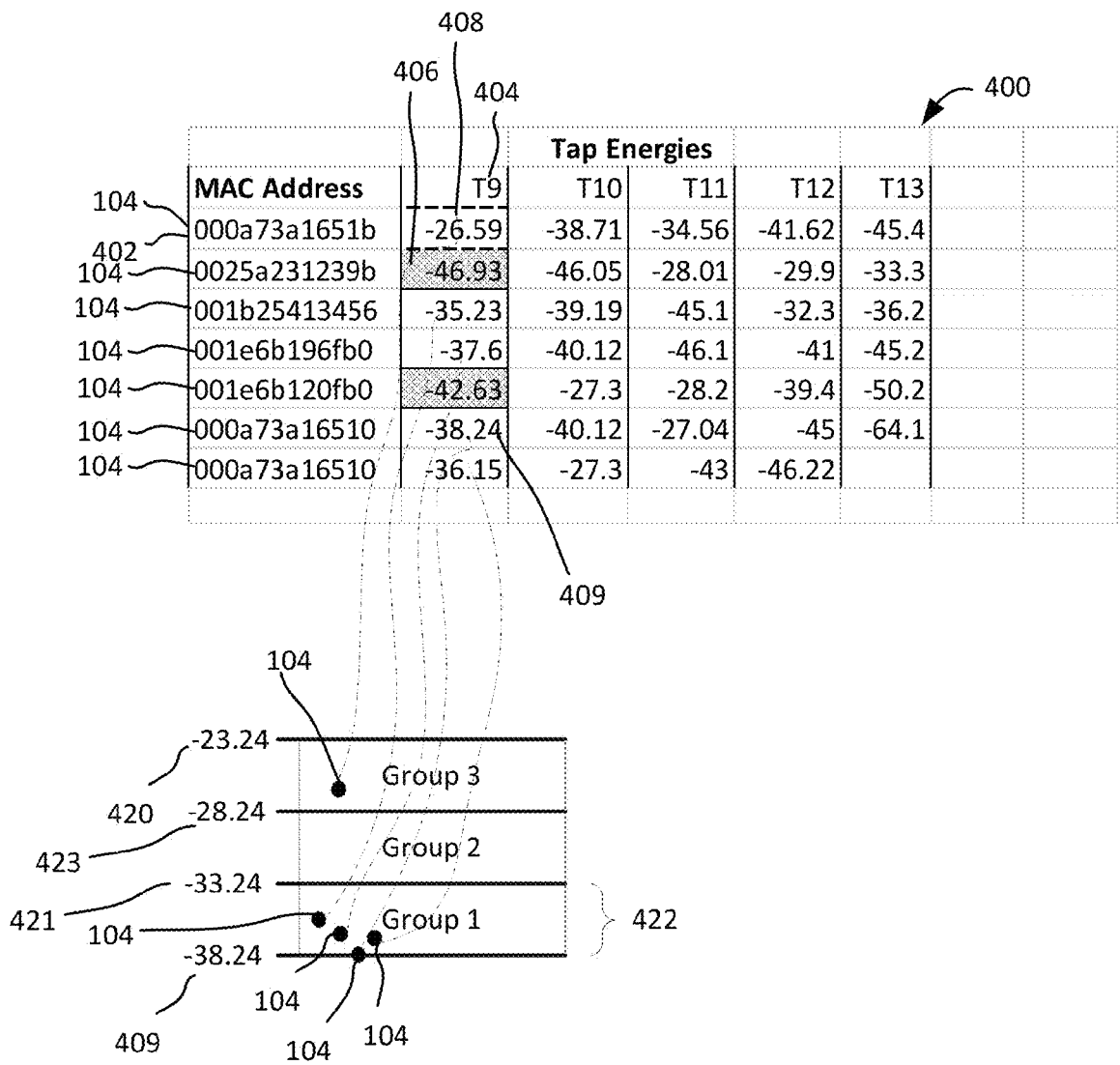
FIG. 4 illustrates example tap energies and example groups created using those tap energies.

For example, referring briefly to FIG. 4, an example tap energy store 400 is illustrated. The tap energy store 400 illustrates the tap energies that are determined at 304 of FIG. 3. Each tap energy is associated with a unique identifier 402 (which is a MAC address in the example) which identifies a customer equipment device 104 and a tap number T9, T10, T11, T12, T13. In the example illustrated, only five tap numbers are illustrated. In practice, the customer equipment devices 104 may include a greater or lesser number of taps. To facilitate readability, only a single unique identifier 402 is labelled in the example. Each unique identifier 402 is associated with a separate customer equipment device 104.

Referring again to FIG. 3, after the tap energies are determined, one of the taps may be selected at 310. That is, one of the tap numbers T9, T10, T11, T12, T13 may be selected. As will be described below, the tap energies for that tap may then be compared for the customer equipment devices.

In at least some embodiments, the lowest tap that is used to correct for micro-reflections in the wired network 100 may be selected at 310. Some of the taps may be used to correct for issues apart from micro-reflections caused by the wired network 100. For example, some of the taps may be used to correct for group delays. In some equalizers, the first eight taps (i.e. T1 to T8) may be used to correct for group delays. In at least some embodiments, these taps (i.e. the taps that are used to correct for group delays) are ignored at 310. More particularly, these taps are excluded from selection.

Similarly, in some equalizers, some of the taps (e.g. T9 and T10) may be used to correct for on-premises wire issues. On-premises wire issues, which may also be referred to as in-home wire issues, are problems that are caused at a specific subscriber's location and which would not be expected to affect other customer equipment devices 104. In at least some embodiments, the taps that are used to correct for on-premises wire issues are ignored at 310. More particularly, these taps are excluded from selection. In some embodiments, two taps may be used for correcting for on-premises wire issues.

Thus, in at least some embodiments, at 310 the fault detection system 116 selects the lowest order tap that is used to correct for micro-reflections in the wired network 100 (i.e. micro-reflections which may be caused by wire problems in a shared portion of the wired network 100) and ignores taps that are not used to correct for micro-reflections in the wired network (such as taps used to correct for group delay and on-premises wire issues).

At 312, the fault detection system 116 defines groups for the selected tap. For example, in some embodiments the fault detection system 116 may examine the tap energies for the selected tap for a plurality of the customer equipment devices 104 (e.g. for all of the customer equipment devices 104 from which pre-equalization coefficients were obtained at 302 or for a selected subset of those customer equipment devices 104). As will be described in greater detail below, these groups will be used for grouping customer equipment devices based on tap energy.

In at least some embodiments, the fault detection system 116 is configured to prevent a customer equipment device 104 from being assigned to a group based on a tap energy if the tap energy for the customer equipment device is outside of a minimum threshold. The minimum threshold may, for example, be a number in the range of −35 dB to −45 dB. In some embodiments, the minimum threshold is −40 dB. If a tap energy is less than the minimum threshold, then that tap energy may not be assigned to a group.

In order to exclude tap energies that are outside of this minimum threshold, the groups defined at 312 may be defined to exclude the tap energies that are outside of the minimum thresholds. For example, in at least some embodiments, the fault detection system 116 identifies the tap energy at the selected tap that is closest to the minimum threshold without being outside of the minimum threshold.

Referring briefly to FIG. 4, the group definition procedure which may be performed at 312 will be described in greater detail with reference to the example data of FIG. 4. In the example, the ninth tap T9 operates as a selected tap 404. That is, the ninth tap T9 is selected at 310. A minimum threshold of −40 dB may be used for the purposes of the example. Two tap energies for the selected tap fall outside of this minimum threshold. These are illustrated using shading and have values of −46.93 and −42.63 in the example (a first excluded value 406 has been labelled for illustrative purposes). These tap energies are excluded from consideration since they are determined to be too low to represent a problem in the wired network 100. The fault detection system 116 identifies the tap energy at the selected tap 404 that is closest to the minimum threshold but not outside of the minimum threshold. This tap energy forms a first threshold 409 for a first group (which is labelled group 1 in the example). In the example, 38.24 is selected.

The fault detection system 116 also identifies a maximum tap energy 408 for the selected tap 404. In the example illustrated, the maximum tap energy 408 is −26.59. Then, the fault detection system 116 uses a predetermined group range 422 (which is 5 dB in the example) to define thresholds for the groups. As noted above, a first threshold 409 has already been defined for the first group (group 1 in the example given). Using this first threshold 409 and the predetermined group range 422, a second threshold 421 for the first group is determined (in the example the second threshold is −33.24 dB). This second threshold 421 for the first group also acts as a first threshold for the second group. Then, another threshold 423 (−28.24 dB in the example) for the second group is determined using the first threshold for the second group and the predetermined group range 422. This process of determining thresholds is repeated until a maximum threshold 420 is reached that is higher than the maximum tap energy 408. In the example, the maximum threshold 420 energy of −23.24 is greater than the maximum tap energy 408 of −26.59; thus, the group definition process ends. Thus, groups are defined such that every tap energy greater than the minimum threshold will fall within the range of a group.

It will be appreciated that other techniques for defining groups may be used in other embodiments. For example, in at least some embodiments, the group thresholds may be predetermined.

Referring again to FIG. 3, at 314 customer equipment devices 104 are assigned to groups. More particularly, each of a plurality of the customer equipment devices 104 may be assigned to one of a plurality of groups (i.e. one of the groups defined at 312). At 314, the tap energy of the selected tap (i.e. the tap selected at 310) of a customer equipment device 104 is compared to the thresholds 409, 421, 423, 420 associated with the groups. The mapping of tap energies to groups is illustrated in FIG. 4.

For example, if a tap energy is between a first threshold 409 and a second threshold 421 associated with a first group, then the customer equipment device 104 associated with that tap energy is assigned to the first group. Similarly, if a tap energy is between a first threshold 421 and a second threshold 423 associated with a second group, then the customer equipment device 104 associated with that tap energy is assigned to the second group. In the example illustrated, four customer equipment devices 104 are assigned to the first group, one to the third group and none to the second group.

In some embodiments, the assignment of a customer equipment device 104 to a group may be performed using a formula. That is, rather than specifically determining thresholds for the groups, the thresholds may be mathematically represented. For example, in some embodiments, the following formula may assign customer equipment devices to groups:

$$\text{Group \#} = \frac{\text{Tap Energy} - \text{First Threshold}}{-\text{Range}} + 1$$

where Tap Energy is the tap energy for the candidate customer equipment device 104, First Threshold is the minimum threshold for any of the groups, which may be selected in the manner described above (e.g. by identifying the tap energy at the selected tap that is closest to the minimum threshold (which is −40 dB in the example) but not outside of the minimum threshold), and Range is the predetermined group range 422 (FIG. 4), which is 5 dB in the example. The result of this equation, when evaluated, may be rounded up to yield the actual group number.

In at least some embodiments, where such a formula is used, customer equipment devices 104 having a tap energy for the selected tap which is less than the minimum threshold may be filtered out. That is, such customer equipment devices may not be assigned a group number at 314.

Referring again to FIG. 3, after the customer equipment devices 104 have been assigned to groups based on their tap energies for the selected tap, at 316, the fault detection system 116 may determine whether a wire fault is probable. More particularly, the fault detection system 116 may determine that a wire fault is probable when one of the groups includes at least a threshold number of customer equipment devices 104. In some embodiments, the threshold number may be three. However, the threshold may vary depending on the number of customer equipment devices 104 being evaluated by the fault detection system 116.

Using the example of FIG. 4, four customer equipment devices 104 have been assigned to a first group. If the threshold number of customer equipment devices 104 for fault detection is set to three, then the fault detection system 116 would determine that a wire fault is probable. More particularly, the fault detection system 116 determines that the customer equipment devices associated with the group having at least the threshold number of customer equipment devices all experience the same wire fault.

Having determined that a particular subset of customer equipment devices 104 operating in the wired network 100 is associated with a common wire fault, the location of that wire fault may be identified (at 317). In at least some embodiments (not illustrated), when it is determined that a wire fault is probable, a location is determined by consulting topology data 155 (FIG. 1) to identify a path that is common for the customer equipment devices in the group that includes at least the threshold number of customer equipment devices. For example, in the example of FIG. 4, since four customer equipment devices are determined to be experiencing a common wire fault, a path that is common for those customer equipment devices is identified.

Then, in at least some embodiments, the fault detection system may determine a distance of the wire fault 121 (FIG. 1) based on the difference between the selected tap (i.e. the tap selected at 310) and a main tap. That is, the distance may be related to the specific tap number. As the tap number increases, so too does the distance. For example, a distance may be calculated as:

$$\text{Distance} = (\text{Tap\#}_{Selected} - \text{Tap\#}_{main}) \times PD$$

where $\text{Tap\#}_{Selected}$ is the number of the tap selected at 310, $\text{Tap\#}_{main}$ is the number of the main tap (which is tap 8 in the example), and PD is a predetermined tap distance which, in at least some embodiments, is approximately 85.57 feet.

The predetermined tap distance may depend on the type of transport medium(s) used in the wired network. The speed of light in free space or a vacuum is 299,792,458 meters per second, or 983,571,056.43 feet per second—1 foot in about 1.02 ns. In coaxial cable with a velocity of propagation of 87%, electromagnetic signals travel at a velocity equal to 87% of the free space value of the speed of light. Thus, the electromagnetic signals travel at approximately 260,819,438.46 meters per second, or 855,706,819.09 feet per second. Accordingly, in such networks, the predetermined tap distance may be approximately 83.565 feet.

The formula for determining the distance of the wire fault described above determines a distance associated with the wire fault based on the difference between the position of the selected tap and the position of the main tap. Tap spacing is the time delay per tap for signal, therefore the difference between the position of the selected tap and the position of the main tap represents how many delay spaces occurred while compensating a microreflection. In a network with 6.4 Mhz bandwidth which is equal to a symbol rate of 5.12 Msym/sec, each tap spacing represents approximately 1/5.12=0.1953125 usec of time delay. Since the tap spacing delay times account for a micro-reflection's round trip (i.e. the distance the signal travels to reach the wire fault causing the micro-reflection and the distance the signal travels from the wire fault), the distance may be divided by two.

Accordingly, in at least some embodiments, the predetermined tap distance may be calculated as:

$$PD = \left(\frac{1}{\text{symbol\_rate}}\right) \times \frac{1}{2} \times \text{travel\_speed},$$

where symbol_rate is the symbol rate (which is 5.12 Msymbols/second in some example embodiments) and travel_speed is the travel speed of the signals in the transmission medium (which may be 855,706,819.09 feet per second in some example embodiments). Thus, the predetermined tap distance for a wired network having a 6.4 Mhz bandwidth and a travel speed of 855,706,819.09 feet per second, the predetermined tap distance may be 83.565 feet. As noted above, this predetermined tap distance may be used together with the tap numbers for the selected tap and the main tap to determine the distance associated with the wire fault.

The distance of the wire fault that is determined based on the selected tap and the main tap represents a distance from a common point of connection for all of the customer equipment devices 104 in the group that includes at least the threshold number of customer equipment devices 104. This common point of connection may be determined from the topology data 155 (FIG. 1).

In at least some embodiments, after the location of the wire fault 121 is identified (at 317), the location associated with the wire fault may be displayed on a map that is displayed on a display screen associated with the fault detection system 116. For example, the wire fault may be overlayed on the map. The map may also display the location of the customer equipment devices 104 in the group which was determined to include at least the threshold number of customer equipment devices. That is, the map may specifically indicate the location of the customer equipment devices 104 that indicated the existence of the wire fault 121.

Referring again to FIG. 3, at 318 the fault detection system 116 may determine whether there is another tap that should be considered. More particularly, in at least some embodiments, the process of identifying wire faults by grouping customer equipment devices based on the tap energies associated with taps for the equalizers of such customer equipment devices may be performed independently for each tap that is used for correcting for micro-reflections in the wired network (as contrasted with taps that are used for correcting for group delay or on-premises wire issues). For example, in a 24 tap equalizer, taps 1 to 8 may be used for group delay, taps 9 and 10 used for on-premises wire issues, and taps 11 to 24 used for correcting for micro-reflections in the wired network. For such systems, 312, 314 and 316 may be performed for each tap that is used for correcting for micro-reflections in the wired network. For example, these steps may be performed independently for each of taps 11 to 24 in this 24-tap example. Thus, at 318, the fault detection system 116 may determine whether steps 312, 314 and 316 have not yet been performed for a tap that is used for correcting for micro-reflections in the wired network. If the steps 312, 314, 316 were performed for all such taps, then the method 300 may end.

If, however, the fault detection system 116 determines at 318 that there is another tap to consider, then at 320 another tap is selected. That is, a tap that is used to correct for micro-reflections in the wired network and that has not yet been considered (i.e. that was not selected at 310 or at a previous iteration of 320) is selected. As noted in the discussion of 310 above, in some embodiments, during 310, the lowest tap that is used to correct for micro-reflections in the wired network is selected. In some such embodiments, at 320 the fault detection system 116 selects a tap that is adjacent to the lowest tap that is used to correct for micro-reflections in the wired network and that is also used to correct for micro-reflections in the wired network. For example, the next-highest ordered tap may be selected at 320. By way of example, if tap 9 was selected at 310 then tap 10 may be selected at the first iteration of 320, tap 11 at the second iteration of 320, and so on.

After a new tap is selected at 320, the method 300 resumes at 312 where groups are newly defined based on the data for the newly selected tap. 312 may be performed in the same manner discussed above, but uses the data from the tap selected at 320 rather than the data from the tap selected at 310. Then, at 314, for each of a plurality of customer equipment devices, the fault detection system 116 assigns the customer equipment device to one of a plurality of the newly defined groups (which may be referred to as other groups) by comparing the tap energy for the tap selected at 320 to thresholds associated with the newly defined groups. Similarly, at 316, the fault detection system again evaluates whether a wire fault is probable. More particularly, at 316 the fault detection system may determine that a wire fault is probable when one of the newly defined groups contains at least a threshold number of customer equipment devices. This threshold may be the same threshold used in the previous iteration of 316 or may be another threshold. That is, in some cases, the threshold may depend on the tap number.

Accordingly, in at least some embodiments, steps of selecting a tap (310, 320), assigning customer equipment devices to groups (314) and determining whether a wire fault is probable (316) are iteratively performed for each tap that is used to correct for micro-reflections in the wired network.

In some embodiments, the wired network 100 may service a large number of customer equipment devices 104 and/or may service customer equipment devices 104 that operate using different operating characteristics such as different frequencies and/or different bandwidths. In such embodiments, some pre-grouping of customer equipment devices 104 may be performed in order to pre-group customer equipment devices 104 having shared characteristics, such as a common service area, common operating frequency and/or common bandwidth. Such pre-grouping may ensure that the groups of step 314 only include customer equipment devices 104 that are sufficiently related to one another.

Referring now to FIG. 5, an example of a method 500 which utilizes such pre-grouping is illustrated. The method 500 includes many steps discussed above with reference to the method 300 of FIG. 3. These steps are illustrated using common reference numerals and the discussion of these steps will not be repeated at length.

At 302, pre-equalization coefficients are obtained and at 304 tap energies are determined. 302 and 304 may operate in the manner described above with reference to FIG. 3.

At 306, the fault detection system 116 may pre-group the customer equipment devices 104 based on predetermined criteria. For example, in some embodiments, the fault detection system 116 may pre-group the customer equipment devices based on a service area 123 (FIG. 1) associated with each customer equipment device 104. Customer equipment devices 104 associated with different areas are included in different pre-groups. Accordingly, in at least some embodiments, at 306, the fault detection system 116 pre-groups the customer equipment devices 104 (e.g. the devices from which pre-equalization coefficients were obtained at 302) by identifying customer equipment devices associated with a common service area 123. Customer equipment devices 104 associated with different service areas 123 are assigned to different pre-groups.

In some embodiments, the fault detection system 116 may receive (at 302) pre-equalization coefficients from customer equipment devices 104 operating on different frequencies. In some embodiments, at 306, the fault detection system 116 may pre-group the customer equipment devices 104 based on the frequency associated with each customer equipment device 104. Customer equipment devices 104 operating on different frequencies are included in different pre-groups. Accordingly, in at least some embodiments, at 306, the fault detection system 116 pre-groups the customer equipment devices 104 (e.g. the devices from which pre-equalization coefficients were obtained at 302) by identifying customer equipment devices 104 operating on a common frequency. Customer equipment devices operating on different frequencies are assigned to different pre-groups.

In some embodiments, the fault detection system 116 may receive (at 302) pre-equalization coefficients from customer equipment devices 104 operating using different bandwidths. In some embodiments, at 306, the fault detection system 116 may pre-group the customer equipment devices 104 based on the bandwidth associated with each customer equipment device 104. Customer equipment devices operating on different bandwidths are included in different pre-groups. Accordingly, in at least some embodiments, at 306, the fault detection system 116 pre-groups the customer equipment devices 104 (e.g. the devices from which pre-equalization coefficients were obtained at 302) by identifying customer equipment devices 104 operating on a common bandwidth. Customer equipment devices 104 operating on different bandwidths are assigned to different pre-groups.

Accordingly, as noted above, the fault detection system 116 may, at 306, pre-group the customer equipment devices 104 based on service area, operating frequency, operating bandwidth, and/or other criteria. In at least some embodiments, the pre-grouping is performed based on multiple criteria. For example, each pre-group may only include customer equipment devices 104 that operate in a common service area, operate using a common frequency, and operate using a common bandwidth.

After the customer equipment devices 104 are pre-grouped, the fault detection system may, at 308, select one of the pre-groups. For example, where the pre-groups represent customer equipment devices that operate in a common service area, operate using a common frequency, and operate using a common bandwidth, a pre-group associated with a specific service area, frequency and bandwidth is selected for evaluation.

Then, the steps 312, 314, 316, 317, 318 320 that were described above with reference to FIG. 3 may be performed using the customer equipment devices in the selected pre-group. These steps are described in detail above with reference to FIG. 3. By pre-grouping the customer equipment devices 104, the groups which are defined at 312 and which are populated with customer equipment devices at 314 are effectively sub-groups of the pre-groups. For example, where pre-grouping is performed by identifying customer equipment devices associated with a common service area, the assignment of customer equipment devices to groups (at 314) is performed on a per-service area basis. That is, when customer equipment devices are assigned to groups at 314, a group will contain only customer equipment devices that are all associated with a common service are. More particularly, all customer equipment devices in any given group used at 314 will be associated with the same service area.

Similarly, where pre-grouping is performed by identifying customer equipment devices associated with a common frequency, the assignment of customer equipment devices 104 to groups (at 314) may be performed on a per-frequency basis. That is, when customer equipment devices are assigned to groups at 314, each group will contain only customer equipment devices that are all associated with a common frequency. More particularly, all customer equipment devices in any given group used at 314 operate on the same frequency.

Similarly, where pre-grouping is performed by identifying customer equipment devices associated with a common bandwidth, the assignment of customer equipment devices to groups (at 314) may be performed on a per-bandwidth basis. That is, when customer equipment devices are assigned to groups at 314, each group will contain only customer equipment devices that are all associated with a common bandwidth. More particularly, all customer equipment devices in any given group used at 314 operate on the same bandwidth.

As noted above, in at least some embodiments, the pre-grouping may be performed based on multiple criteria. For example, each pre-group may only include customer equipment devices that operate in a common service area, operate using a common frequency, and operate using a common bandwidth. In such embodiments, when customer equipment devices are assigned to groups at 314, each group contains only customer equipment device that are associated with a common bandwidth, a common frequency, and a common service area.

The steps 310, 312, 314, 316 and 317 are, in the method 500 of FIG. 5, performed for the customer equipment devices in the pre-group that is currently selected. For example, when a tap is selected at 310, the tap is selected for the customer equipment devices 104 in the selected pre-group. When groups are defined for the selected tap (at 312), they are defined based on tap energies from the customer equipment devices 104 in the selected pre-group for the selected tap. The determination of whether a wire fault is probable (at 316) may be performed using the customer equipment devices that were grouped at 314. Thus, the determination of whether a wire fault is probable is based on the customer equipment devices of the selected pre-group.

As with the method 300 of FIG. 3, at 318, the fault detection system may determine whether there is another tap to consider (this may operate as described above with reference to FIG. 3) and, if so, may select another tap at 320 and re-iterate the group definition step (312), customer equipment device assignment step (314), wire fault determination step (316) and location determination step (317) for the newly selected step. This iteration of the steps 312, 314, 316, 317, 318 is performed for customer equipment devices in the same pre-group as in the previous iteration of the steps 312, 314, 316, 317, 318. The process of assigning customer equipment devices to groups based on tap energies and then determining whether a wire fault is probable is iteratively performed until there are no more taps for consideration for customer equipment devices in the selected pre-group. For example, the process of assigning customer equipment devices to groups based on tap energies and then determining whether a wire fault is probable may be iteratively performed until all of the taps that are used to correct for wire faults in the wired network have been considered. If, at 318, the fault detection system determines that there are no more taps that need to be considered for the currently selected pre-group, then at 322, the fault detection system 116 may determine whether there is another pre-group that has not yet been considered. That is, at 322, the fault detection system 116 determines whether the steps 310, 312, 314, 316, 317, 318, 320 have already been performed for all pre-groups. If so, then the method ends.

If, however, one or more pre-groups have not yet been evaluated (i.e. if the customer equipment devices in that pre-group have not yet been assigned to groups at 314), then another pre-group is selected at 324. After another pre-group is selected, the previously discussed steps 310, 312, 314, 316, 317, 318, 320 may be performed for the customer equipment devices 104 in the newly selected pre-group. For example, when a tap is selected at 310, the tap is selected for the customer equipment devices 104 in the newly selected pre-group. When groups are defined for the selected tap (at 312), they are defined based on tap energies from the customer equipment devices 104 in the newly selected pre-group for the selected tap. The determination of whether a wire fault is probable (at 316) may be performed using the customer equipment devices that were grouped at 314. Thus, the determination of whether a wire fault is probable is based on the customer equipment devices of the newly selected pre-group.

Referring now to FIG. 6, an example of another method 600 of detecting wire faults is illustrated. The method 600 includes many steps discussed above with reference to the method 300 of FIG. 3. These steps are illustrated using common reference numerals and the discussion of these steps will not be repeated at length. It will be appreciated that the additional features of the method 600 may, in at least some embodiments, be included in the method 500 of FIG. 5 discussed above.

The method 600 allows the groups defined in 312 of the methods 300, 500, 600 to be dynamically re-defined to determine whether, based on a different grouping, a wire fault may be detected.

At 302, pre-equalization coefficients may be obtained as described above with reference to FIG. 3. At 304, tap energies are determined in the manner described above with reference to FIG. 3. At 310, a tap is selected in the manner described above with reference to FIG. 3. In some embodiments (not shown), pre-grouping may be performed as described above with reference to FIG. 5. Then, at 312, groups may be defined for the selected tap in the manner described above with reference to FIG. 3 or FIG. 5 and, at 314, customer equipment devices may be assigned to groups in the manner described above with reference to FIG. 3 or FIG. 5. Then, at 316, the fault detection system may determine whether a wire fault is probable. At 317, a location of a wire fault is determined.

In at least some embodiments, at 602, the fault detection system may create new groups by adjusting the thresholds associated with the groups defined at 312. The new groups may have the same predetermined group range 422 (FIG. 4 and FIG. 7) as the groups created at 312. However, the groups may have different thresholds.

Figure 7:
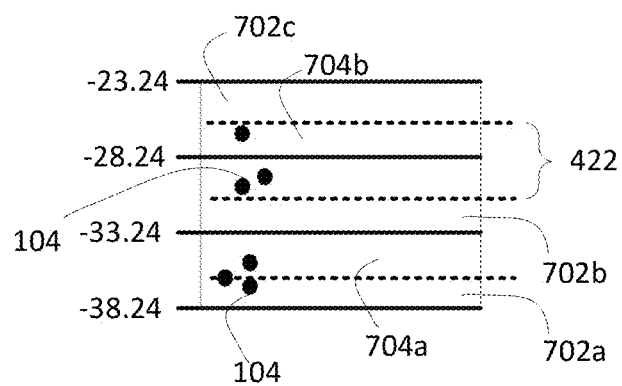
FIG. 7 illustrates example groups and new groups in accordance with example embodiments of the present disclosure.

By way of example, reference is briefly made to FIG. 7 which illustrates a plurality of groups 702a, 702b, 702c which were defined at 312. A first group 702a has a first threshold of −38.24 dB and a second threshold of −33.24 dB, a second group 702b has a first threshold of −33.24 dB and a second threshold of −28.24 dB and a third group 702c has a first threshold of −28.24 dB and a second threshold of −23.24 dB. The predetermined group range 422 for each of these groups is the same; 5 dB in the illustrated example. The fault detection system may (at 602) create new groups 704a, 704b by adjusting these thresholds. In the illustrated example, two new groups are created at 602—a first new group 704a having a range of −35 dB to −30 dB and a second new group 704b having a range of −30 dB to −25 dB. The predetermined group range 422 of each of the new groups is the same and the predetermined group range 422 of the new groups 704a, 704b is the same as the predetermined group range 422 of the previous groups 702a, 702b, 702c. The thresholds for the new groups may be selected using one or more predetermined rules. For example, in some embodiments, the thresholds for the new groups may be midway between the thresholds for the old groups.

Referring again to FIG. 6, after the new groups are defined, at 604, the fault detection system 116 may re-assign the customer equipment devices 104 to the new groups by comparing the tap energy for the selected tap for the plurality of customer equipment devices to the thresholds associated with the new groups. 604 may operate in the same manner as 314 but may use the new groups defined at 602 rather than the old groups defined at 312.

Then, at 606, the fault detection system 116 determines whether a wire fault is probable. 606 may operate in the same manner as 316 but may be based on the number of customer equipment devices 104 assigned to the new groups (i.e. the groups defined at 602) rather than the old groups (i.e. the groups defined at 312). More particularly, the fault detection system 116 may determine that a wire fault is probable when one of the new groups includes at least the threshold number of customer equipment devices.

As described above with reference to the method 300 of FIG. 3, the fault detection system may then determine whether another tap needs to be considered and, if so, may select another tap at 320. Based on tap energy values associated with the newly selected tap, the process of determining whether a wire fault exists is again performed.

In some embodiments (not shown), the steps 602, 604, 606 involving the new groups may only be performed if a particular condition is satisfied. For example, in some embodiments, prior to creating the new groups (at 602), the fault detection system may identify a group that does not include at least a threshold number of customer equipment devices (e.g. in some embodiments, it identifies a group that does not have at least 3 customer equipment devices). The fault detection system may determine whether the identified group and another one of the groups, which is adjacent to the identified group collectively include at least the threshold number of customer equipment devices. If a pair of adjacent groups do not individually contain the threshold number of customer equipment devices but collectively contain the threshold number of customer equipment devices, then the steps 602, 604, 606 involving the new groups may be performed. That is, if this condition is satisfied, then new groups may be created.

This condition will be further discussed with reference to FIG. 7. In the example of FIG. 7, the second group 702b includes two customer equipment devices 104 and the third group 702c includes one customer equipment device 104. If the threshold for determining that a wire fault is probable is set to three then the third group and the second group would not, themselves, suggest any wire faults. However, since these groups are adjacent to one another and collectively have at least the threshold number of customer equipment devices (i.e. together they have three customer equipment devices), then one or more new groups 702a, 702b may be formed. That is, steps 602, 604, 606, may be performed. The second new group 702b then includes the threshold number of customer equipment devices, suggesting (at 606) that a wire fault is possible.

The various embodiments presented above are merely examples and are in no way meant to limit the scope of this disclosure. Variations of the innovations described herein will be apparent to persons of ordinary skill in the art, such variations being within the intended scope of the present application. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A processor implemented method of detecting a wire fault in a wired network, the wired network servicing a set of customer equipment devices, the method comprising:
   obtaining, from a plurality of the customer equipment devices, pre-equalization coefficients associated with equalizers of the plurality of the customer equipment devices;
   determining tap energies for taps associated with the equalizers based on the pre-equalization coefficients;
   selecting one of the taps;
   for each of a plurality of the customer equipment devices, assigning the customer equipment device to one of a plurality of groups by comparing the tap energy for the selected tap for that customer equipment device to thresholds associated with the groups; and
   determining that a wire fault is probable when one of the groups includes at least a threshold number of customer equipment devices.

2. The method of claim 1, further comprising:
   creating new groups by adjusting the thresholds associated with the groups and re-assigning the customer equipment devices to the new groups by comparing the tap energy for the selected tap for the plurality of customer equipment devices to the thresholds associated with the new groups; and
   determining that a wire fault is probable when one of the new groups includes at least the threshold number of customer equipment devices.

3. The method of claim 2, further comprising, prior to creating the new groups:
   identifying one of the groups that does not include at least the threshold number of customer equipment devices; and
   determining that the identified group and one of the groups that is adjacent to the identified group collectively include at least the threshold number of customer equipment devices.

4. The method of claim 1, further comprising:
   selecting a different one of the taps;
   for each of a plurality of the customer equipment devices, assigning the customer equipment device to one of a plurality of other groups by comparing the tap energy for the selected different one of the taps for that customer equipment device to thresholds associated with the other groups; and
   determining that a wire fault is probable when one of the other groups contains at least a threshold number of customer equipment devices.

5. The method of claim 1, further comprising:
   determining a location associated with the wire fault by:
      consulting topology data to identify a path that is common for the customer equipment devices in the group that includes at least the threshold number of customer equipment devices; and
      determining a distance of the wire fault based on the difference between the selected tap and a main tap.

6. The method of claim 1, further comprising:
   identifying customer equipment devices associated with a common service area, and
   wherein the assigning of customer equipment devices to groups by comparing tap energies is performed on a per-service area basis.

7. The method of claim 6, further comprising:
   identifying customer equipment devices operating on a common frequency, and
   wherein the assigning of customer equipment devices to groups by comparing tap energies is performed on a per-frequency basis so that a group may only include customer equipment devices operating on a common frequency.

8. The method of claim 7, further comprising:
   identifying customer equipment devices operating using a common bandwidth, and
   wherein the assigning of customer equipment devices to groups by comparing tap energies is performed on a per-bandwidth basis so that a group may only include customer equipment devices operating using a common bandwidth.

9. The method of claim 1, wherein selecting one of the taps comprises selecting a lowest tap that is used to correct for micro-reflections in the wired network.

10. The method of claim 4, wherein selecting one of the taps comprises selecting a lowest tap that is used to correct for micro-reflections in the wired network and wherein selecting a different one of the taps comprises selecting a tap that is adjacent to the lowest tap that is used to correct for micro-reflections in the wired network and that is also used to correct for micro-reflections in the wired network.

11. The method of claim 1, wherein the steps of selecting, assigning and determining that a wire fault is probable are iteratively performed for each tap that is used to correct for micro-reflections in the wired network.

12. The method of claim 5, further comprising, after determining the location associated with the wire fault:
- displaying the location associated with the wire fault on a map.

13. The method of claim 1, further comprising:
if the tap energy for a customer equipment device is outside of a minimum threshold, preventing that customer equipment device from being assigned to a group based on that tap energy.

14. The method of claim 13, wherein the minimum threshold is a number in the range of −35 dB to −45 dB.

15. A fault detection system for detecting a wire fault in a wired network, the wired network servicing a set of customer equipment devices, the fault detection system comprising:
- a memory;
- a processor coupled to the memory, the processor being configured to:
  - obtain, from a plurality of the customer equipment devices, pre-equalization coefficients associated with equalizers of the plurality of the customer equipment devices;
  - determine tap energies for taps associated with the equalizers based on the pre-equalization coefficients;
  - select one of the taps;
  - for each of a plurality of the customer equipment devices, assign the customer equipment device to one of a plurality of groups by comparing the tap energy for the selected tap for that customer equipment device to thresholds associated with the groups; and
  - determine that a wire fault is probable when one of the groups includes at least a threshold number of customer equipment devices.

16. The fault detection system of claim 15 wherein the processor is further configured to:
- create new groups by adjusting the thresholds associated with the groups and re-assigning the customer equipment devices to the new groups by comparing the tap energy for the selected tap for the plurality of customer equipment devices to the thresholds associated with the new groups; and
- determine that a wire fault is probable when one of the new groups includes at least the threshold number of customer equipment devices.

17. The fault detection system of claim 16, wherein the processor is further configured to, prior to creating the new groups:
- identify one of the groups that does not include at least the threshold number of customer equipment devices; and
- determine that the identified group and one of the groups that is adjacent to the identified group collectively include at least the threshold number of customer equipment devices.

18. The fault detection system of claim 15, wherein the processor is further configured to:
- select a different one of the taps;
- for each of a plurality of the customer equipment devices, assign the customer equipment device to one of a plurality of other groups by comparing the tap energy for the selected different one of the taps for that customer equipment device to thresholds associated with the other groups; and
- determine that a wire fault is probable when one of the other groups contains at least a threshold number of customer equipment devices.

19. The fault detections system of claim 15, wherein the processor is further configured to:
- determine a location associated with the wire fault by:
  - consulting topology data to identify a path that is common for the customer equipment devices in the group that includes at least the threshold number of customer equipment devices; and
  - determining a distance of the wire fault based on the difference between the selected tap and a main tap.

20. A non-transitory computer readable storage medium comprising computer executable instructions for detecting a wire fault in a wired network, the wired network servicing a set of customer equipment devices, the computer executable instructions including instructions for:
- obtaining, from a plurality of the customer equipment devices, pre-equalization coefficients associated with equalizers of the plurality of the customer equipment devices;
- determining tap energies for taps associated with the equalizers based on the pre-equalization coefficients;
- selecting one of the taps;
- for each of a plurality of the customer equipment devices, assigning the customer equipment device to one of a plurality of groups by comparing the tap energy for the selected tap for that customer equipment device to thresholds associated with the groups; and
- determining that a wire fault is probable when one of the groups includes at least a threshold number of customer equipment devices.

* * * * *